UNITED STATES PATENT OFFICE.

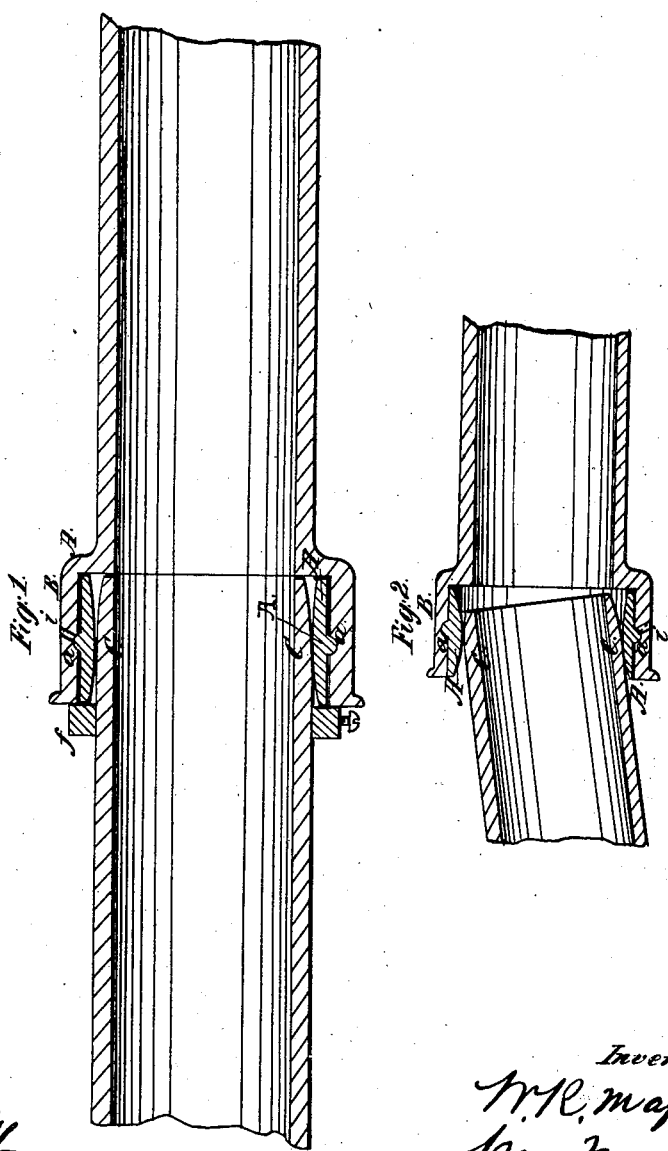
W. R. Maffet,
Pipe Coupling.
N° 46,808.   Patented Mar. 14, 1865.
Witnesses:
C. L. Topliff
Henry Morris
Inventor:
W. R. Maffet
per Munn & Co
Attorneys

W. R. MAFFIT, OF WILKES-BARRE, PENNSYLVANIA.

JOINTS FOR PIPES.

Specification forming part of Letters Patent No. 46,808, dated March 14, 1865.

*To all whom it may concern:*

Be it known that I, W. R. MAFFIT, of Wilkes-Barre, in the county of Luzerne and State of Pennsylvania, have invented a new and Improved Joint for Pipes; and I do hereby declare that the following is a full, clear, and exact description thereof, which will enable others skilled in the art to make and use the same, reference being had to the accompanying drawings, forming part of this specification, in which—

Figure 1 represents a longitudinal central section of my invention when applied to pipes running in right lines. Fig. 2 is a similar section of the same when the pipes deviate from a right line.

Similar letters of reference indicate like parts.

The usual method of making joints of pipes is to place the pipes in position and drive in hemp-yarn in the space where the "spigot" adjusts against the "bell." Then there is run in from two to three inches of lead and calked by means of a hammer, the mechanic having the earth dug away from the bell to allow the use of the hammer and calking-chisel on the under side. This operation is tedious and expensive.

The object of this invention is to supersede the old method by the use of a wooden ring prepared by proper machinery out of one solid piece, if the ring is small, or out of a number of sections or staves when the ring is large, and applied to the spigot end of the pipe in such a manner that by the expansion or swelling of the ward in the bell a tight joint is produced, and furthermore the compressibility of the wood allows the pipes to assume an angular position, or a position deviating from a right line, without producing leakage; or, if desired, the inner surface of the wooden ring may be more or less convex, to give the pipes a still better chance to assume an angular position.

A represents the wooden ring, which may be made out of one solid piece, if desired, but for large pipes it is preferable to make the same out of a number of section, or staves like a pail or barrel. When the pipe is made to order for my joint, the ring is introduced into the bell end, B, and the spigot C of the adjoining end, being slightly tapering, is forced into it by means of a hydraulic press or other power. The bell B is provided with an annular groove, a, so that the compression of the wood when the spigot is introduced, and the swelling of the same by coming in contact with the water, will form a shoulder and prevent the disturbance of the joint by the ram or pressure of water. Besides this, a hole, i, is made in the bell B, through which a suitable substance can be introduced to fill up any space between the ring A and the inner surface of the bell, caused by irregularities of casting, and also as a preservation to the wood.

To allow the pipe to be laid curved, occasional joints are used having a convex face, as shown in the drawings, but for pipes running in a right line the inner face of the ring must be flat or slightly tapering, to facilitate the introduction of the spigot, and if the pipe should settle and deviate from a right line the wood is compressed on one and allowed to expand on the other side, and the joint is not disturbed.

It will be seen that the wood can be put in the pipe outside of the ditch or at the foundery, and the pipes can be constructed with great rapidity when introduced into the ditch.

In order to apply my joint to ordinary pipe I proceed in the following manner: Before the spigot end is introduced into the bell, the wooden ring is placed round the outside of said spigot end and secured by a lapping of twine or wire at the end adjoining the bell, and by a similar arrangement at the other end, or by a projection on the clamp f. This clamp is placed around the pipe, back of the ring, and held in position by one or more screws or other means, so that when the ring is introduced into the bell and the spigot end forced into position, the ring will not be moved, but remain on the spigot end of the pipe, in proper position, until the end of the pipe is brought in contact with the bell.

If my ring is applied to gas-pipe to prevent the escape of gas through the pores of the wood lengthwise, it will be necessary to saturate the same with some material not acted upon by gas.

Having thus described my invention, what I claim as new, and desire to secure by Letters Patent, is—

Connecting pipes in the manner and by the means described.

W. R. MAFFIT.

Witnesses:
S. P. SLEPPY,
OCTAVIUS KNIGHT.